United States Patent
Kong et al.

(10) Patent No.: US 9,520,797 B2
(45) Date of Patent: Dec. 13, 2016

(54) ADAPTIVE REFERENCE VOLTAGE FOR SWITCHING POWER CONVERTERS

(71) Applicant: Dialog Semiconductor Inc., Campbell, CA (US)

(72) Inventors: Pengju Kong, Campbell, CA (US); Hien Bui, Campbell, CA (US); Duc Doan, Campbell, CA (US); Fuqiang Shi, Campbell, CA (US); Judy Sha, Campbell, CA (US)

(73) Assignee: DIALOG SEMICODUCTOR INC., Campbell, CA (US)

( * ) Notice: Subject to any disclaimer, the term of this patent is extended or adjusted under 35 U.S.C. 154(b) by 0 days.

(21) Appl. No.: 14/584,859

(22) Filed: Dec. 29, 2014

(65) Prior Publication Data

US 2016/0164420 A1    Jun. 9, 2016

Related U.S. Application Data

(60) Provisional application No. 62/089,146, filed on Dec. 8, 2014.

(51) Int. Cl.
*H02M 3/335* (2006.01)
*H02M 1/00* (2006.01)

(52) U.S. Cl.
CPC ......... *H02M 3/33523* (2013.01); *H02M 3/335* (2013.01); *H02M 3/33546* (2013.01); *H02M 3/33576* (2013.01); *H02M 2001/0032* (2013.01)

(58) Field of Classification Search
CPC ....................................................... H02M 3/335
USPC ........................................... 363/21.16, 21.18
See application file for complete search history.

(56) References Cited

U.S. PATENT DOCUMENTS

| | | | | |
|---|---|---|---|---|
| 2009/0174978 A1* | 7/2009 | Nakamura | ......... | H02H 7/1213 361/90 |
| 2010/0020570 A1* | 1/2010 | Melanson | ......... | H01F 3/10 363/26 |
| 2010/0182808 A1* | 7/2010 | Sato | ......... | H02M 3/33592 363/21.18 |
| 2011/0261596 A1* | 10/2011 | Zong | ......... | H02M 3/33507 363/21.13 |
| 2013/0107584 A1* | 5/2013 | Li | ......... | H02M 1/08 363/21.12 |
| 2014/0112028 A1* | 4/2014 | Fahlenkamp | ......... | G01R 22/06 363/21.12 |

* cited by examiner

*Primary Examiner* — Matthew Nguyen
*Assistant Examiner* — Trinh Dang
(74) *Attorney, Agent, or Firm* — Haynes and Boone, LLP

(57) ABSTRACT

A switching power converter is provided that detects an activity signal generated in response to load activity using an adaptively-declining threshold.

17 Claims, 4 Drawing Sheets

ADAPTIVE REFERENCE VOLTAGE FOR SWITCHING POWER CONVERTERS

RELATED APPLICATIONS

This application claims the benefit of U.S. Provisional Application No. 62/089,146, filed Dec. 8, 2014, the contents of which are incorporated herein in their entirety.

TECHNICAL FIELD

This application relates to switching power converters, and more particularly a switching power converter configured to use to an adaptive reference voltage.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through opto-isolators bridging from the secondary side to the primary side but this adds to cost and control complexity. Thus, primary-only feedback techniques have been developed that use the reflected voltage on the primary side of the transformer in each switching cycle.

In a switching cycle for a flyback converter, the secondary current (the current in the secondary winding of the transformer) pulses high after the primary-side power switch is cycled off. The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques use this reflected voltage to efficiently modulate the power switching and thus modulate the output voltage.

One issue, however, with primary-only feedback occurs during low-load or no-load periods of operation. The controller in the flyback converter detects this lack of activity and stops cycling the power switch accordingly so that the secondary side is not driven out of regulation. The resulting lack of pulsing is satisfactory so long as the load remains dormant. But should the load again be applied, the controller has no way of detecting this without a secondary current pulse being generated to produce reflected voltage on the primary side (for example, as sensed through a primary-side auxiliary winding).

To solve this problem in primary-only feedback architectures, an activity detector is provided on the secondary side that is configured to generate a secondary current pulse in response to the application of the load despite the power switch continuing to be dormant. An example of an activity detector is provided by commonly-assigned U.S. application Ser. No. 14/340,482, (the '482 application) filed Jul. 24, 2014, the contents of which are hereby incorporated by reference in their entirety. The secondary-side activity detector detects the termination of a secondary winding current pulse as generated conventionally from a cycling of the primary-side power switch. As discussed above, the termination of the secondary winding current pulse occurs at the transformer reset time. After this transformer reset time, the voltage across the primary-side auxiliary winding will oscillate due to the resonant circuit formed by the inductance of the transformer and the parasitic capacitance of the power switch. Since this oscillation could be interpreted by the controller as the application of a load (or occurrence of a fault condition), the secondary-side activity detector will not generate an activity pulse for a "blanking period" after the transformer reset time to allow the auxiliary winding oscillations to sufficiently subside. Upon the termination of the blanking period, the activity detector monitors the voltage drop across the rectifying diode on the secondary side to determine whether a load has been applied. With an applied load, the voltage across the rectifying diode changes as the load capacitor discharges. The activity detector detects this voltage difference across the rectifying diode and switches on a low-impedance current path that bypasses the rectifying diode. Advantageously, the activity detector may comprise a two-terminal device such as disclosed in the '482 application that couples to the cathode and anode of the rectifying diode. In other architectures, the activity detector may comprise a three-pin (or higher) device that raises manufacturing costs as compared to the use of a two-terminal activity detector. Should the activity detector detect a load-induced voltage change across the rectifying diode subsequent to the blanking period, it shorts the cathode and anode of the rectifying diode through its low-impedance alternative current path. This low-impedance current path enables the charged output capacitor on the secondary side of the transformer to send a pulse of secondary current that creates a reflected pulse on the primary-side auxiliary winding. The flyback controller is configured to detect this secondary current pulse. Since this secondary current pulse is not created by the pulsing of the power switch, the corresponding pulse in the reflected voltage is denoted herein as an "activity signal" to distinguish it from the reflected voltage obtained from a power switch cycle.

In response to detecting the activity signal, the flyback controller cycles the power switch pulse. The resulting reflected voltage from cycling of the power switch may then be used as is known in primary-only feedback techniques to directly monitor the output voltage so that it may be regulated accordingly. Although the generation of an activity signal is quite advantageous to address the lack of feedback information while the load is dormant or absent, the resulting flyback control suffers from several problems. For example, the flyback controller cannot receive an activity signal during the duration of the blanking period. The flyback controller thus is unable to respond to any sudden applications of a load during the blanking period. But this blanking period must be sufficiently long to encompass the voltage oscillations on the auxiliary winding that occur after the transformer reset time. In addition, the activity signal amplitude diminishes over time with respect to the blanking period termination. In other words, should activity be detected relatively shortly after the blanking period termination, the resulting activity signal as reflected onto the primary-side auxiliary winding will be relatively strong. In contrast, should activity be detected after a longer delay from the blanking period termination, the activity signal amplitude will be weaker. The snubber circuit associated with the primary winding may cause this reduction in activity signal amplitude with respect to the delay from the blanking period termination. The threshold used by the flyback converter to detect the presence of the activity signal should thus be relatively low so that the weaker activity signals from relatively long delays can be detected. But such a low threshold raises the possibility of responding to noise.

Accordingly, there is a need in the art for improved flyback control techniques to detect activity of the load following a period of reduced or dormant power switch cycling.

SUMMARY

To improve the detection of activity signal pulses generated by an activity detector on the secondary side of a flyback switching converter transformer, a primary side controller is provided that detects the activity signals using an adaptive threshold. This detection occurs during a detection period that occurs while the power switch has ceased cycling. This lack of cycling for the power switch presents a problem for primary-only feedback flyback converters because the reflected voltages produced from each cycle of the power switch provide feedback information about the output voltage. To provide feedback information about reestablishment of a load after cessation of the power switch cycling, an activity detector on the secondary side of the transformer pulses the secondary winding current to produce an activity signal that comprises a reflected voltage at the primary side of the transformer.

The detection period for the controller begins after a termination of a blanking period following a last power switch cycle. The blanking period begins at the transformer reset time. At the beginning of the detection period, the adaptive threshold is relatively robust as activity signals are relatively strong at that time. In this fashion, the blanking period can be reduced as compared to conventional uses of a static threshold to detect the activity signal. This reduction in the blanking period does not lead to erroneous detections of activity signals from the voltage oscillations that occur during the blanking period because of the relative strength of the adaptive threshold at that time. As the detection period continues, the adaptive threshold decreases because the amplitude of the activity signals decreases with respect to delay from the beginning of the detection period. In this fashion, sensitivity is maintained without the false detections and blanking period delays associated with conventional techniques.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved activity signal detection architectures, a flyback converter is provided that uses an adaptively-decreasing threshold to detect the activity signal generated by a secondary-side activity detector. The activity detector asserts the activity signal in response to the application of a load or the occurrence of a fault condition subsequent to a blanking period following a last power switch cycle before the power switch cycling becomes dormant. In this fashion, the blanking period may be reduced because the controller uses a relatively high threshold immediately subsequent to the blanking period termination. The auxiliary winding voltage may continue to oscillate without producing a false detection of an activity signal due to the continued oscillations because of the relative strength of the threshold at that time. In contrast, a detection of the activity signal using a fixed threshold would require a longer blanking period. Although the banking period is reduced, the system still detects the activity signals having reduced amplitude due to relatively long delays from the blanking period termination because the threshold is reduced as a function of the delay. Alternatively, a series of stepwise discontinuous reductions may be made in the activity signal threshold. These advantageous features may be better appreciated with regard to the following example embodiments.

Figure 1:
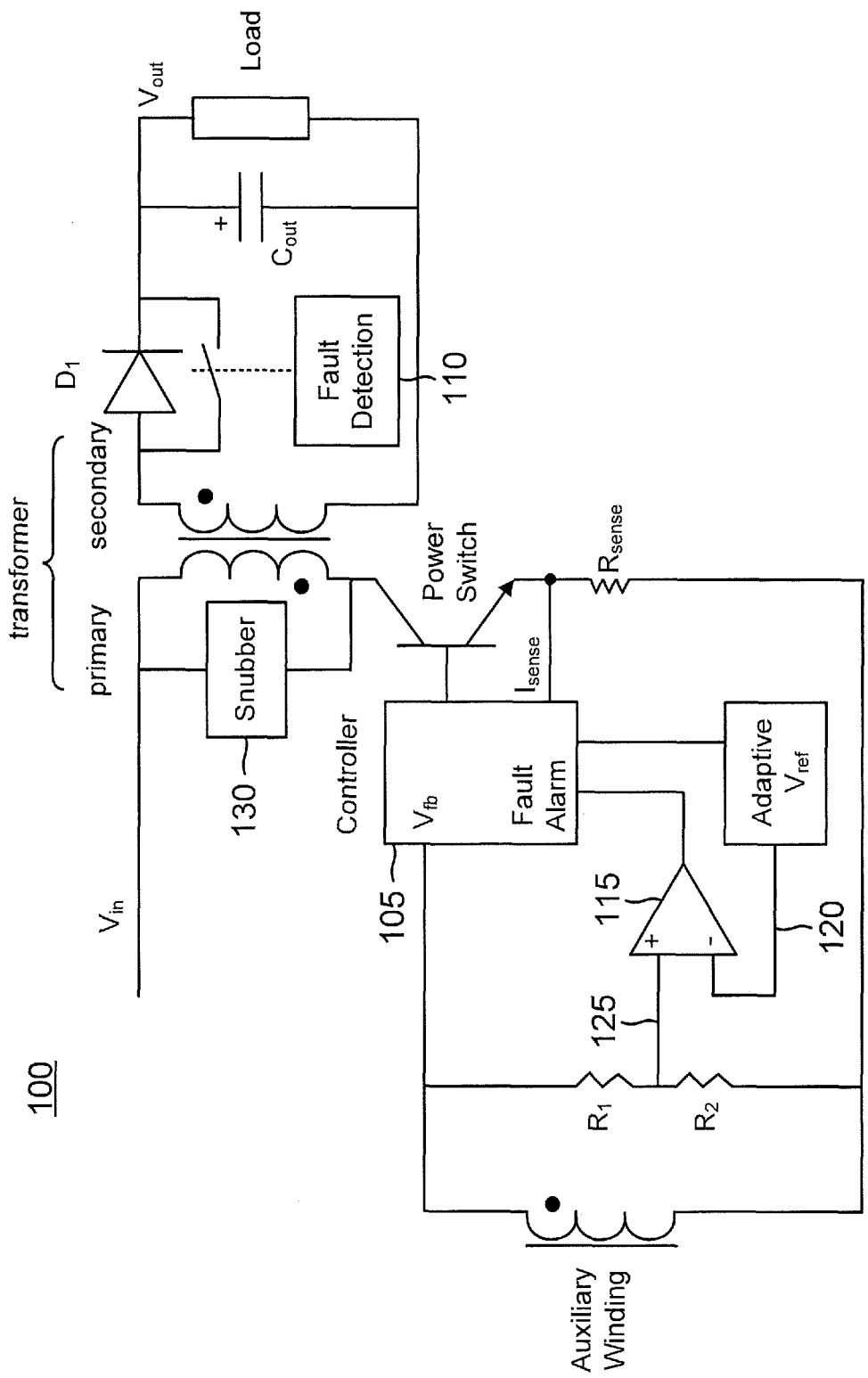
FIG. 1 is a diagram of a flyback converter including a controller having an adaptive threshold for detecting activity of the load in accordance with an embodiment of the disclosure.

An example flyback converter 100 is shown in FIG. 1. A rectified input voltage (Vin) drives a primary winding of a transformer when a controller 105 switches on a power switch. In converter 100, the power switch in a bipolar junction transistor (BJT) power switch but it will be appreciated that MOSFET power switches may be used in alternative embodiments. To cycle the power switch on, controller 105 drives a base current $I_B$ into the base of the BJT power switch to drive it into saturation. Based upon the input voltage $V_{IN}$ and a magnetizing inductance for the transformer, the collector current $I_C$ then ramps up from zero to a peak collector current value, whereupon controller 105 switches off the BJT power switch to complete a switching cycle. The collector current is also the primary winding current for the transformer. The resulting emitter current from the BJT power switch equals the sum of the base and collector currents.

Controller 105 controls the amount of collector current responsive to a feedback ($V_{fb}$) voltage derived from a reflected voltage on an auxiliary winding. When controller 105 turns off the base current to turn off the BJT power switch, a rectifying diode D1 on the secondary side of the transformer becomes forward biased such that the stored energy in the transformer is delivered as an output voltage ($V_{out}$) across a load as filtered by a load capacitor $C_{out}$. This delivery of energy to the load produces a reflected voltage on the auxiliary winding that is a function of the voltage drop across the diode D1 and the output voltage $V_{out}$. As this energy delivery is depleted, a secondary current in a secondary winding of the transformer will drop to zero such that there is no diode voltage drop, whereupon the reflected voltage is directly proportional to $V_{out}$. As discussed earlier, this time is denoted as the transformer reset time (Trst) and thus represents the ideal time to sample the reflected voltage ($V_{fb}$) to obtain an accurate estimate of the output voltage $V_{out}$.

The feedback voltage $V_{fb}$ is just one parameter that may be used in the primary-only feedback implemented by controller 105. For example, the primary winding current may be sampled through a sense resistor $R_{sense}$ to produce an $I_{sense}$ voltage that represents the primary winding current amplitude. In flyback converter 100, the sense resistor is sampling the emitter current so controller 105 may determine the collector current (and hence the primary current) by subtracting the base current from the sampled emitter current. In MOSFET power switch embodiments, the $I_{sense}$ voltage would be directly proportional to the primary winding current. Controller 105 may use the rate of change of the collector current as determined through the $I_{sense}$ voltage to indirectly measure the input voltage $V_{in}$. This is quite advantageous as controller 105 may then determine the input voltage $V_{in}$ without requiring an additional input pin. In this fashion, controller 105 may process $V_{sense}$ and $I_{sense}$ from a previous pulse to determine the desired peak collector current in the subsequent pulse on a pulse-by-pulse basis.

Through this primary-only feedback, controller 105 can determine the output voltage $V_{out}$ from the reflected voltage whenever a pulse is generated. But there may be periods of little or no load in which controller 105 ceases to send pulses so as to prevent the output voltage from being driven out of regulation. An application of a load during these null periods could thus pull the output voltage too low as the controller 105 is not generating pulses to detect this activity. A secondary side activity detector 110 thus functions as discussed, for example, in the '482 application to detect the application of a load during these null periods so as to switch on a low impedance path that bypasses diode D1 so that an activity signal is received on the primary-side auxiliary winding as a reflected voltage. Since there is a relatively small amount of charge stored on the output capacitor $C_{out}$, the on-time duration for the application of the low-impedance path (and thus the duration of the resulting activity signal) may be relatively short. For example, the activity signal may have a duration of 500 ns in one embodiment. Activity detector 110 may generate a series (or just one) of such pulsed activity signals in response to detecting the application of a load or a fault condition. Regardless of whether one or a series of activity signals are generated, activity detector 110 waits for a blanking period after the transformer reset time to allow the resonant oscillations on the auxiliary winding to lessen prior to the detection of any subsequent activity.

Controller 105 detects when the transformer reset time occurs so that it may sample the reflected voltage at that time to determine the feedback voltage $V_{fb}$. Controller 105 may then time a duration of a blanking period from the transformer reset time. Upon the completion of the blanking period, controller 105 initiates a detection period in which it enables a comparator 115 to compare an adaptive threshold 120 to a an activity signal 125 voltage as received, for example through a voltage divider formed by a pair of resistors R1 and R2. Controller 105 enables comparator 115 to begin comparing adaptive threshold 120 to the sampled version 125 of the activity signal upon the initiation of the detection period upon the termination of the blanking period. Controller 105 is thus configured with the blanking period duration that is also used by activity detector 110. To enable the use of a relatively short blanking period, controller 105 is configured to generate adaptive threshold 120 so as to have a relatively high amplitude immediately upon termination of the blanking period. However, this relatively high value for adaptive threshold 120 is undesirable as the delay from the blanking period termination increases. For example, a snubber circuit 130 may cause the amplitude of the activity signal to decrease as the delay from the initiation of the detection period increases. A relatively high value for the adaptive threshold may fail to enable the detection of such relatively delayed activity signals. Controller 105 is thus configured to decrease adaptive threshold 120 as a function of the elapsed time from the blanking period termination. This decrease may be linear, stepwise linear, or non-linear. When a minimum level for the adaptive threshold is reached, controller 105 then maintains adaptive threshold 120 at this minimum level for the remaining duration of the detection period. Since both the feedback voltage $V_{fb}$ and the activity signal voltage 125 are versions of a reflected voltage produced by secondary winding current, the feedback voltage $V_{fb}$ may also be denoted herein as a "first reflected voltage" whereas activity signal voltage 125 may be denoted as a "second reflected voltage."

Figure 2:
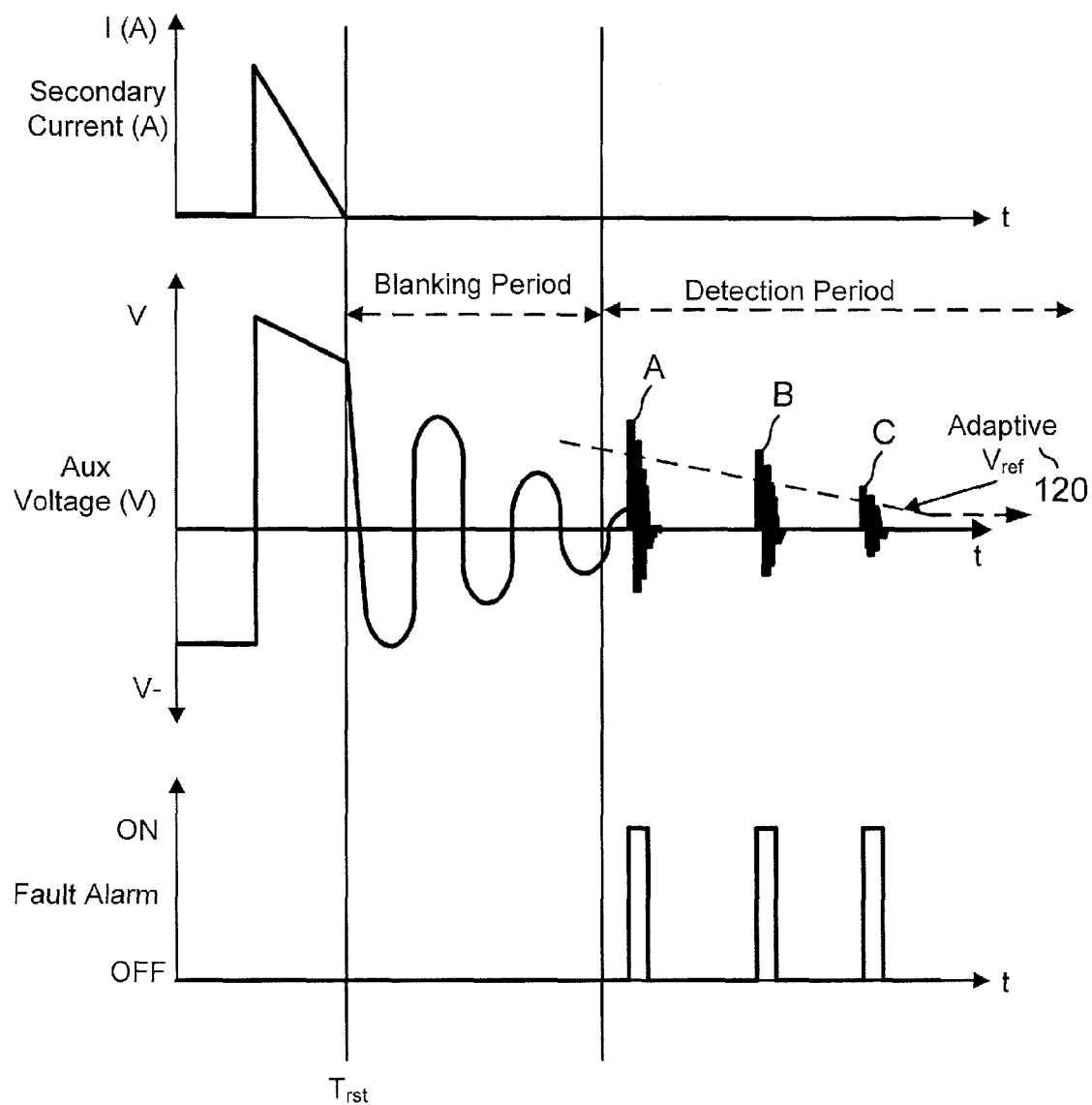
FIG. 2 illustrates the second current, auxiliary winding voltage, and fault alarm waveforms for some example activity signals.

An example of an adaptively-decreasing threshold is shown in FIG. 2. In this embodiment, the threshold is decreased linearly with regard to delay from the detection period initiation. A cycling of the primary side power switch (not illustrated) causes a pulse of secondary current which ramps down to zero at the transformer reset time (Trst). The reflected voltage on the auxiliary winding (Aux Voltage) then begins to oscillate as discussed previously during the blanking period. But note that the active region during which the adaptive threshold is compared to the reflected voltage can begin even while the reflected voltage is still oscillating as the adaptive threshold voltage 120 is relatively high at that time. An activity signal A as represented by the reflected voltage can thus be detected at this time despite the remnant oscillations still occurring on the auxiliary winding. Comparator 115 of FIG. 1 would then drive its output signal high, which is received by controller 105 as a fault alarm. A similar fault alarm is generated subsequently for an activity signal B but with regard to a reduced value for adaptive threshold voltage 120. Similarly, another fault alarm is generated for an activity signal C with regard to an even more reduced value for adaptive threshold 120. In this fashion, the detection of activity signals is more and more sensitive with regard to elapsed time from the blanking period termination due to a similar reduction in the activity signals. It will be appreciated that FIG. 2 is simplified in that controller 105 would generate a pulse in response to the assertion of the fault alarm. As shown in FIG. 2, the adaptive threshold voltage 120 is reduced until a minimum level is reached, whereupon it is maintained at this minimum level for the remainder of the detection period.

Figure 3:
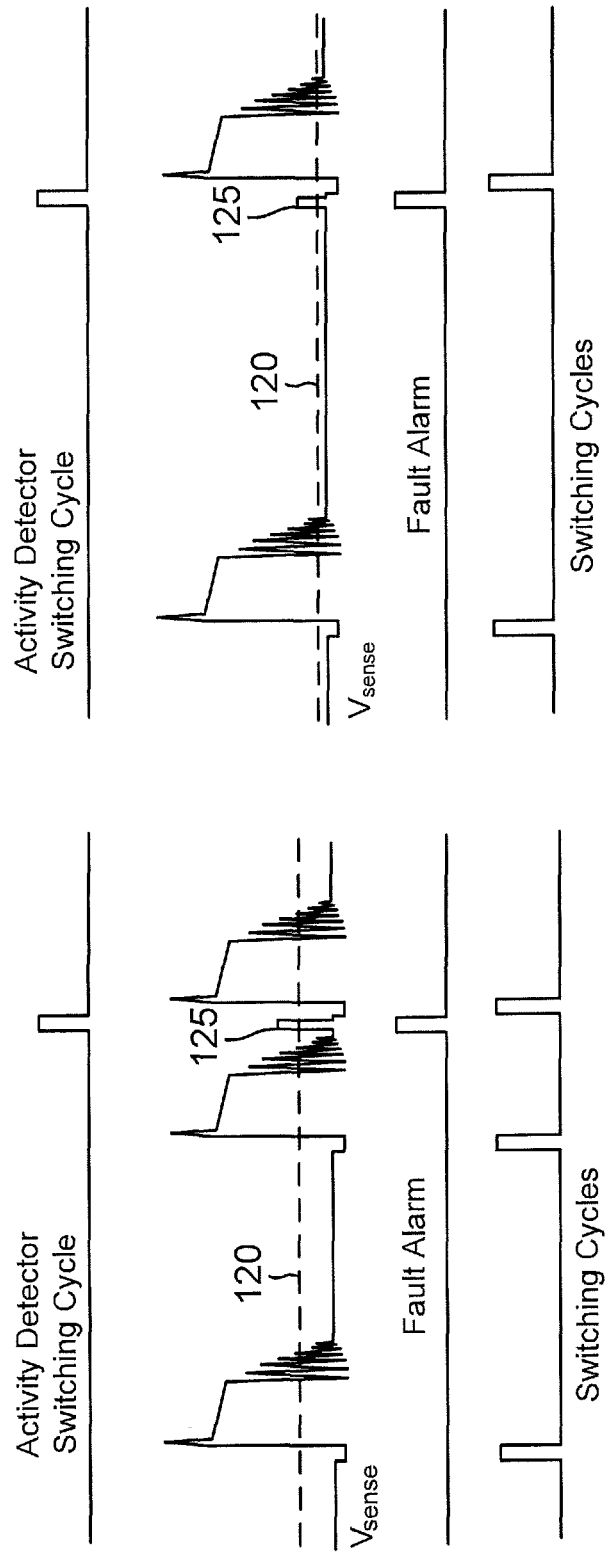
FIG. 3A illustrates waveforms resulting from an activity signal that occurs relatively soon after the beginning of the detection period.
FIG. 3B illustrates waveforms resulting from an activity signal that occurs relatively delayed with respect to the activity signal of FIG. 3A.

The generation of pulses in response to activity signals is illustrated in FIGS. 3A and 3B. FIG. 3A illustrates a switching waveform for an activity detector in response to the detection of load activity relatively soon after completion of a power pulse. Adaptive threshold 120 is thus relatively high. For illustration purposes, this relatively high level for adaptive threshold 120 is shown as a constant value in FIG. 3A. Referring again to FIG. 1, the cycling of the diode-shorting switch by activity detector 110 produces a relatively strong activity signal on the auxiliary winding when the activity detection occurs relatively close to the initiation of the detection period. As shown in FIG. 3A, the activity signal 125 can thus surpass the relatively high level for the adaptive threshold 120. A fault alarm is thus triggered by comparator 115, which in turn triggers a cycling of the power switch. In contrast, the activity detector cycling in FIG. 3B occurs after a longer delay from the initiation of the detection period. Adaptive threshold 120 in FIG. 3B is thus smaller than what was applied in FIG. 3A. The resulting activity signal 125 is thus weaker but triggers a fault alarm due to the reduced level for the adaptive threshold 120. The fault alarm in turn triggers a power switch cycle. Referring again to FIG. 3A, the resonant oscillations of the reflected feedback voltage (designated as $V_{sense}$) are triggered after each power switch cycle off time. Because the adaptive threshold 120 is relatively high, it is greater than the trailing edge of each resonant oscillation. Thus, the detection period may begin even while the resonant oscillations continue so long as the timing of the detection period initiation is chosen so that the remaining resonant oscillations are less than the adaptive threshold 120. In this fashion, the relatively lengthy blanking period of conventional techniques may be reduced.

Figure 4:
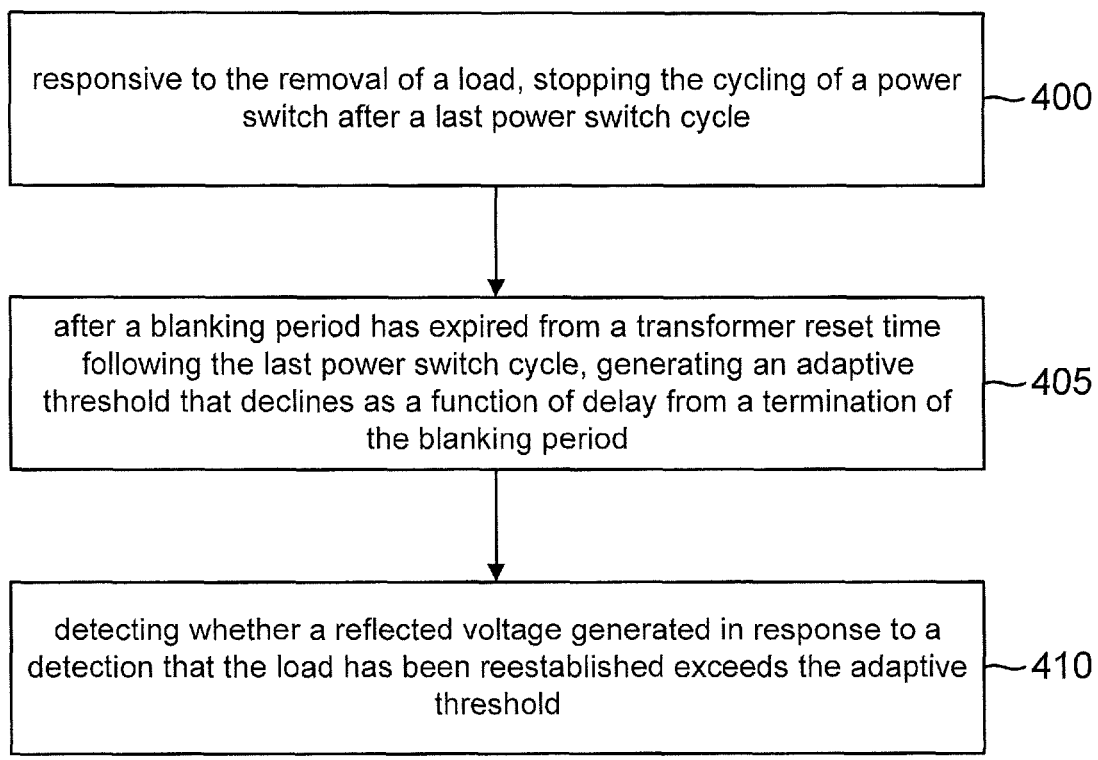
FIG. 4 is a flowchart for an example method of operation using an adaptive threshold in accordance with an embodiment of the disclosure.

A flowchart for an example method of operation for a flyback converter including an adaptive threshold as discussed herein is shown in FIG. 4. An initial act 400 is responsive to the removal of a load and comprises stopping the cycling of a power switch after a last power switch cycle. The cessation of the power switch cycling as discussed with, for example, FIG. 2 is an example of act 400. The method also includes an act 405 that occurs after a blanking period has expired from a transformer reset time following the last power switch cycle. It is at this point that the detection period begins in conjunction with the act 405 of generating an adaptive threshold that declines as a function of delay from a termination of the blanking period. The generation of the adaptive threshold 120 shown in FIG. 2 is an example of act 405. As discussed previously, the decrease in the adaptive threshold 120 cannot continue indefinitely as controller 105 would then respond to a default DC value for activity signal 125, which would result in false alarms and needless generation of power switch cycles. Thus, the adaptive threshold 125 is maintained as a constant once it has decreased to a clamped, minimum value. Moreover, it will be appreciated that controller 105 need not linearly decrease adaptive threshold 120 but may instead step adaptive threshold 120 down using a finite number of steps. For example, adaptive threshold 120 may be held constant at a relatively high value immediately upon the initiation of the detection period. After a certain amount of time, controller 105 may then reduce adaptive threshold 120 to medium level. Eventually, controller 105 may step adaptive threshold 120 from this medium level to a minimum, clamped value.

Finally, the method also includes an act 410 of detecting whether a reflected voltage generated in response to a detection that the load has been reestablished exceeds the adaptive threshold. The detection of the activity signal 125 exceeding adaptive threshold 120 as discussed with regard to FIG. 2 is an example of act 410.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
    a power switch coupled to a primary winding of a transformer;
    a controller configured to cease a cycling of the power switch responsive to processing a first reflected voltage produced at a transformer reset time after each cycling of the power switch, the controller being further configured to time a detection period beginning after a termination of a blankout period following a last cycle of the power switch; and
    a comparator configured to determine whether a second reflected voltage triggered by an activity detector coupled to a secondary winding of the transformer exceeds an adaptive threshold that declines during the detection period, wherein the controller is further configured to initiate an additional cycle of the power switch responsive to a determination by the comparator that the second reflected voltage exceeds the adaptive threshold, wherein the controller is configured to control the adaptive threshold such that it has a maximum value at an initiation of the detection period and such that it declines from this maximum value over the detection period until it is clamped at a minimum value.

2. The switching power converter of claim 1, further comprising an auxiliary winding configured to produce the first reflected voltage, the switching power converter further comprising a voltage divider coupled to the auxiliary winding, wherein the voltage divider is configured to produce the second reflected voltage.

3. The switching power converter of claim 1, wherein the comparator is configured to assert a fault alarm signal responsive to a determination that the second reflected voltage exceeds the adaptive threshold, and wherein the controller is further configured to trigger the additional cycle of the power switch responsive to the assertion of the fault alarm signal.

4. The switching power converter of claim 1, wherein the controller is configured to control the adaptive threshold such that it linearly declines from the maximum value to the minimum value.

5. The switching power converter of claim 1, wherein the controller is configured to control the adaptive threshold such that it stepwise declines from the maximum value to the minimum value.

6. The switching power converter of claim 1, wherein the power switch is a BJT power switch.

7. The switching power converter of claim 1, wherein the power switch is a MOSFET.

8. The switching power converter of claim 1, wherein the controller is further configured to time the detection period such that it begins after a blanking period terminates subsequent to the transformer reset time after the last cycle of the power switch.

9. The switching power converter of claim 8, wherein the controller is further configured to time the detection period such that the blanking period termination occurs while a resonant oscillation continues responsive to the last power switch cycle.

10. A method, comprising:
    responsive to the removal of a load coupled to a secondary winding of a transformer, stopping the cycling of a power switch after a last power switch cycle, wherein the power switch is coupled to a primary winding of the transformer;
    after a blanking period has expired from a transformer reset time following the last power switch cycle, generating an adaptive threshold that declines as a function of a delay from a termination of the blanking period, wherein generating the adaptive threshold comprises generating an adaptive threshold that linearly declines until it is clamped at a minimum value; and detecting whether a reflected voltage on an auxiliary winding of the transformer exceeds the adaptive threshold, wherein the reflected voltage is generated by an activity detector coupled to the secondary winding.

11. The method of claim 10, wherein the blanking period that expired after the transformer reset time following the last power switch comprises a blanking period that expired while a resonant oscillation was still ongoing.

12. The method of claim 10, wherein detecting whether the reflected voltage exceeds the adaptive threshold comprises asserting a fault alarm signal responsive to the detection, the method further comprising:

triggering an additional power switch cycle responsive to the assertion of the fault alarm signal.

13. The method of claim 12, wherein triggering the additional power switch cycle comprises triggering an additional cycle of a BJT power switch.

14. The method of claim 12, wherein triggering the additional power switch cycle comprises triggering an additional cycle of a MOSFET power switch.

15. A switching power converter, comprising:

an activity detector coupled to an output diode on a secondary side of a transformer, the activity detector being configured to activate a low impedance path bypassing the output diode in response to a detection of activity by a load, wherein the activation of the low impedance path triggers a current pulse in a secondary winding in the transformer;

a power switch coupled to a primary winding of the transformer; and a controller configured to cycle the power switch responsive to a detection that a reflected voltage produced on an auxiliary winding of the transformer in response to the current pulse exceeded an adaptively declining threshold following a blankout period subsequent to a previous cycle of the power switch, wherein the adaptively declining threshold is a linearly-declining threshold.

16. The switching power converter of claim 15, further comprising:

a comparator coupled to an auxiliary winding, the comparator configured to compare the reflected voltage produced by the current pulse to the adaptively declining threshold to produce the detection.

17. The switching power converter of claim 15, wherein the power switch is a BJT power switch.

* * * * *